March 1, 1949.　　　　G. A. NELSON　　　　2,463,414
POCKET BAROMETER

Filed March 7, 1945　　　　　　　　　　2 Sheets-Sheet 1

INVENTOR.
GUSTAF A. NELSON
BY
Ernest D. Givin
ATTORNEY

March 1, 1949. G. A. NELSON 2,463,414
POCKET BAROMETER
Filed March 7, 1945 2 Sheets-Sheet 2

INVENTOR.
GUSTAF A. NELSON
BY
Ernest D. Given
ATTORNEY

Patented Mar. 1, 1949

2,463,414

UNITED STATES PATENT OFFICE 2,463,414

POCKET BAROMETER

Gustaf A. Nelson, Brooklyn, N. Y., assignor to The Liquidometer Corporation, Long Island City, N. Y., a corporation of Delaware Application March 7, 1945, Serial No. 581,408

7 Claims. (Cl. 73—386)

This invention relates to improvements in measuring instruments, particularly to improvements in measuring instruments where a comparatively small change of the magnitude of a condition to be measured produces an actuating movement of comparatively great magnitude.

One of the objects of this invention is to provide means for multiplying or amplifying a small mechanical movement of a moving element of a measuring instrument of the type above described.

Another object of the invention is to provide a novel mechanical means for multiplying a small mechanical movement of a moving element of the measuring instrument.

Another object of the invention is to provide a novel measuring instrument of the type described permitting a convenient indicating of the last preceding reading.

Another object of the invention is to provide a novel measuring instrument of the type described which permits ascertaining conveniently within limits whether the magnitude of the condition to be measured or read has a rising or falling trend.

Another object of the invention is to provide a novel measuring instrument of the type described which is of simple construction, free from delicate movements, has a comparatively small size and is readily adaptable to manufacturing methods.

Other and further objects, features and advantages of the invention will appear hereinafter and in the appended claims forming part of the specification.

In a now preferred form, the invention is used for the measurement of barometric pressure. In this application, an evacuated chamber is used wherein a diaphragm is actuated in response to change of atmospheric pressure. The diaphragm is made to carry, and thus to displace a moving element including a magnet and a pointer. The magnet of this moving element cooperates with a set of magnetic elements which control the position of the pointer. The indication is preferably of the null type since the pointer is adjusted to be always in a fixed position when the reading is taken on a suitably calibrated rotatable dial.

While the invention is described in connection with the measurement of barometric pressure or more specifically in connection with a pocket barometer, it should be understood that the principle of the invention is equally applicable to the measurement of any other quantity (i. e. the magnitude of any condition) which can be translated into mechanical motion. For example, as will be apparent to those skilled in the art, the principle employed in the illustrative embodiment herein disclosed may be applied to the measurement of temperature, humidity, gravity or flow differentials. It may also be used as an indicating means in conjunction with limit gauges and other applications where a small differential in movement is to be indicated.

A more complete understanding of the invention will be attained by the following detailed description in connection with the accompanying drawings in which.

Figure 1:
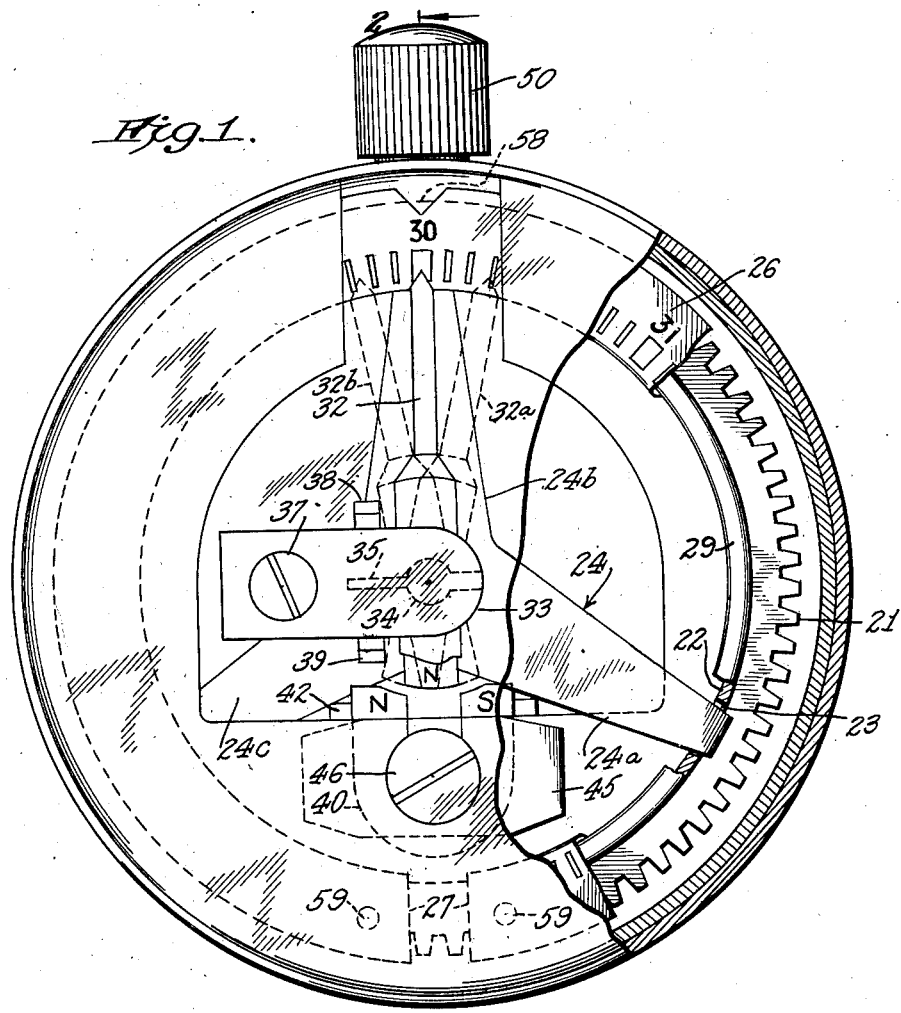
Fig. 1 is a plan view having a portion broken away of a pocket barometer incorporating the principles of the invention.
Figure 2:
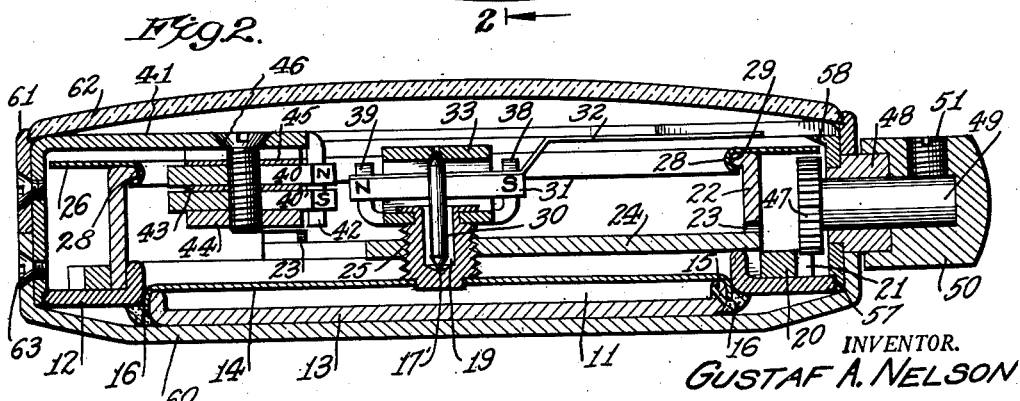
Fig. 2 is a sectional view taken along lines 2—2 of Fig. 1.
Figure 3:
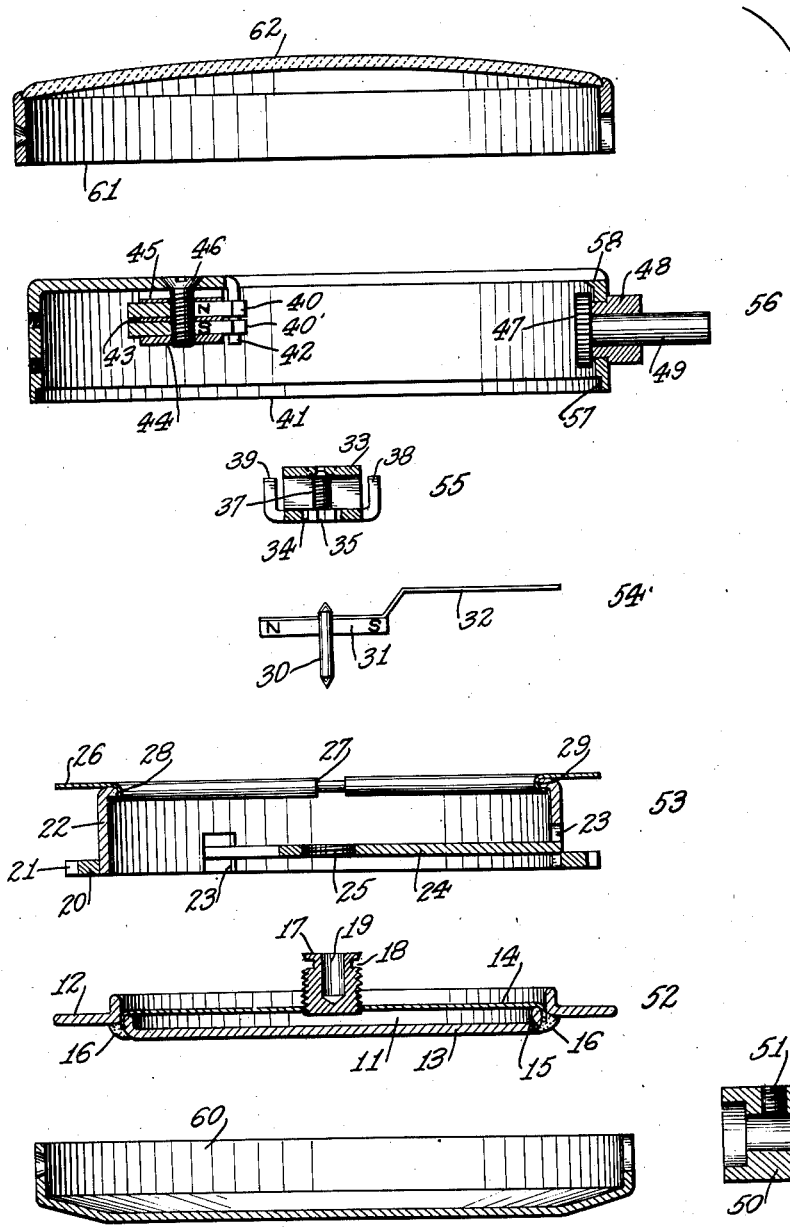
Fig. 3 is an exploded view of the barometer again taken along lines 2—2, and showing in detail the essential parts of the barometer.

Referring to Figs. 1, 2 and 3, an evacuated chamber 11 is formed by and between a diaphragm housing 13 and a diaphragm 14. It should, of course, be understood that a chamber filled with a gas under pressure may be provided instead of an evacuated chamber. Mounted on diaphragm 14 is a threaded bushing 17. The two elements are soldered together or otherwise fastened to insure a pressure seal. The bushing has an undercut section 18 (Fig. 3). A pivot support 19 is provided in the bushing to form a bearing for the pivot point of a shaft 30. The diaphragh 14 is mounted over housing 13 and then inserted in a diaphragm guide 12. These elements are rigidly assembled and sealed preferably by soldering all around the circumference such as shown at 16 in Figs. 2 and 3. A hole 15 in diaphragm housing 13 may be provided to evacuate the air from chamber 11, and is then sealed off by soldering.

The barometer further comprises an annular dial 26 preferably made of sheet material. The dial has a relatively large inside diameter as compared to the outside diameter. The inner portion of the dial may be curved such as shown at 28 in Figs. 2 and 3, to fit a curved section of a dial support 22.

Dial 26 is further cut such as at 27, thus leaving a gap between the dial edges. Holes 59 are provided so that the two ends of the dial may be drawn together so that the dial when the barometer is assembled may be contracted as to the diameter of the inner part 28 to pass within an inwardly extending flange 29 of the dial support 22. Once past the flange 29, the dial is allowed to spring back in place, and will be rigidly held to support 22.

The wall of the dial support 22 is also provided with three vertical slots 23 preferably equally spaced around the diameter. These slots engage three fingers 24a, 24b and 24c of an adjusting spring 24. At the center of adjusting spring 24 is a hole 25 (Fig. 3) threaded to cooperate with the threads of bushing 17. Rigidly mounted to dial support 22 is a setting gear 20 having teeth 21 which extend through the full circle. This gear may be a forced fit on the support 22 but it is also possible to make support 22 and gear 21 of a single piece, to simplify the assembly.

The moving element of the barometer comprises a permanent bar magnet 31 and a pointer 32 both rigidly mounted on a shaft 30 rotatably supported by bushing 17. The magnet 31 is charged along its length and the pointer is preferably arranged to align itself with the poles of the magnet, even though this is not an essential feature of the invention. The upper bearing for shaft 30 is located in a pointer bracket 33. The lower section of this bracket is provided with a slot 35 and a hole 34 made to fit around undercut 18 of threaded bushing 17.

In order to provide proper adjustment of the clearance for the operation of the pivot points of shaft 30, a screw 37 (Fig. 1) may be inserted between the two parallel sections of the bracket 33 and made to engage a threaded hole on the lower section, so that by turning screw 37 clockwise, the two sections are drawn together and the pivot clearance is reduced. Conversely, by turning screw 37 counterclockwise, the two sections of bracket 33 are sprung apart and the pivot clearance is increased.

Integral with bracket 33 are two formed sections 38 and 39 which serve as pointer stops as will hereinafter be described.

The magnet 31 of the moving element cooperates with two stationary permanent magnets 40, 40'. Various arrangements may be employed to assemble these stationary magnets in relation to the moving magnet. According to one form of this invention, it is preferable to mount these magnets in a housing 41, which also may serve as a dial shield to cover the unused portion of dial 26. Integral with this housing are two ears 42 bent vertically down which serve to locate the two magnets 40, 40'. These magnets are assembled with a spacer 43 between them and with opposite poles adjacent. They are mounted on housing 41 by means of a screw 46 which is inserted through the magnets and threaded into a plate 44 as is clearly shown on Fig. 3. A spring washer 45 located between the housing 41 and the magnets 40, 40' prevent any shifting of the magnets.

Vertical adjustment of the magnets 40, 40' is achieved by turning the screw 46 as desired. For example, if it is desired to raise the magnets, the screw 46 is turned clockwise, thus screwing it further into plate 44. This will raise the magnets and compress the spring washer 45 to make up for the difference in vertical displacement. If adjustments require that the magnets be lowered, the screw 46 is turned counterclockwise. This will force plate 44 down, lowering the magnets 40, 40'. In this case, the spring washer 45 will expand, thus again compensating for the difference in vertical displacement.

The magnetic system has been shown in connection with the use of permanent magnets 31, 40, 40'.

Also mounted on housing 41 opposite that portion carrying the magnets 40, 40' is a setting gear 47 which engages teeth 21 on gear 20 as shown on Fig. 2. Gear 47 may be operated manually from a shaft 49, which extends outside the case through a bushing 48. A knurled knob 50 may be clamped to shaft 49 by a set screw 51 to simplify manual turning. An index such as 58 (Fig. 1) may also be provided on housing 41, to obtain alignment of the pointer as will hereinafter be described in greater detail.

The assembly of the barometer is best understood in connection with the exploded view of Fig. 3. The vacuum system generally designated 52 is assembled to the dial support assembly 53 by threading adjusting spring 24 into bushing 17, until the underside of gear 20 rests on guide or flange 12 and is rotated clockwise until tension of spring 24 has caused diaphragm 14 to move upward to a normal operating position. When gear 20 is made to turn, it will carry spring 24 around with it and either raise or lower bushing 17 depending on the direction of rotation.

Mounted in the bushing 17 is the moving element generally designated 54 and the bracket generally designated 55 to form the top support for the shaft of the moving element. Bracket 55 is clamped around the undercut section 18 of bushing 17. As previously explained, the pivot clearance can be adjusted by turning the screw 37.

The dial shield assembly generally designated 56 in Fig. 3 and which carries the stationary magnets, is located so that the dial indication corresponding to existing barometric pressure aligns itself with index 58 on the housing 41 and so that the stationary magnets align themselves with the pointer magnet 31 and the gear 47 engages the setting gear 21. An undercut section 57 of housing 41 is spun over, or otherwise placed over the outer diameter of flange 12 as is better shown in Fig. 2.

The movement is housed in a case composed of two sections 60, 61. The upper section 61 having a bezel holds a transparent cover 62. Assembly may be made such as by screws 63 (Fig. 2) threaded into the housing 41.

Manufacturing adjustments are readily made at known barometric pressure. Knob 50 is turned until a dial indication corresponding to the barometric pressure aligns itself with index 58 of the dial shield. Screw 46 is turned as required and as previously explained to obtain a balance in the magnetic transmission between magnets 40, 40' and magnet 31 causing pointer 32 to align itself with index 58 of the dial shield.

The operation of the device will now be described in detail. As the barometric pressure increases, the vacuum chamber 11 will contract and the diaphragm 14 will be drawn down, carrying with it bushing 17 and the moving magnet 31. As the magnet 31 is displaced downward, the balance of the magnetic transmission is unbalanced, causing the pointer 32 to swing off the index 58 and to a position such as 32a, Fig. 1, which is limited by the rear section of magnet 31 coming into contact with the pointer stop 39. In order to obtain the new barometric pressure, the knob 50 is turned to reestablish the balance of the magnetic system. As knob 50 is turned, setting gear 20, which is in mesh with gear 47, will also be turned. This turns the dial support 22 carrying with it adjusting spring 24. Spring 24, in turning, raises bushing 17 and the magnet 31 in relation to stationary magnets 40, 40'. As balance is restored, the pointer will swing back from position 32a toward a position where it will register with index 58. When balance has been obtained, the pointer will again be aligned with index 58 and the registration of the pointer with the dial indication below this alignment will indicate the new barometric pressure.

If the barometric pressure decreases, the vacuum chamber 11 will expand, and the diaphragm 14 will be displaced upward, carrying with it the bushing 17 and the moving magnet 31. As the magnet moves upward, the balance of the magnetic transmission is unbalanced in the opposite direction, causing the pointer 32 to swing off the index 58 and to a position such as 32b, Fig. 1, which is limited by the front section of the magnet 31 coming into contact with the pointer stop 38. In order to determine this new barometric pressure the knob 50 is turned to again reestablish the balance of the magnetic system. As knob 50 is turned, setting gear 20 is turned and spring 24 causes the bearing 17 and the magnet 31 to be lowered in relation to stationary magnets 40, 40'. As balance is restored, the pointer 32 will swing back from position 32b toward a position where it will register with index 58. When balance has been obtained, the pointer will again be aligned with the index 58 and the registration of the pointer with the dial indication below this alignment will indicate the new barometric pressure.

Of particular value for an instrument of this class is its ability to distinguish within limits the difference between a falling barometer and a rising barometer. In predicting weather, it is often not of particular importance to know what the actual barometer pressure is, but rather whether the pressure has a falling trend or a rising trend. A falling barometer, for example, will indicate a coming storm. However, an observer can not know whether the pressure is falling or rising unless a previous reading has been known or indicated. With a barometer according to the invention, the last reading is always indicated on the dial below the index 58. Hence, when an observer takes a new reading, he will know what the previous reading was and when making an adjustment to a new pressure can determine whether the barometer is rising or falling.

While the magnetic transmission has been shown in connection with a barometer, it may be effectively used for other applications either alone or in combination with a vacuum chamber or other suitable drives. It has been found that with a magnetic transmision according to the invention for a small linear movement of the pointer magnet, a large angular movement of the pointer can be obtained, for example, an angular motion of 3 degrees can be produced from a linear motion of .0001 inch by the magnet 31. If a pointer length of .750 inch be assumed, the length of arc spanned by the pointer tip is .039 inch. Thus, by making the indicator of the null measuring type, the maximum sensitivity is obtained.

While the invention has been described in detail with respect to a certain preferred example and embodiment it will be understood by those skilled in the art after understanding the invention, various changes and modifications may be made without departing from the spirit and scope of the invention, and it is intended, therefore in the appended claims to cover all such changes and modifications.

What is claimed is:

1. An indicating device having a motion multiplying apparatus responsive to a relatively small movement of a member which is arranged to be moved in accordance with the magnitude of a condition for imparting a relatively much larger movement to an indicating element, said device comprising said member which is arranged to be moved in a predetermined direction in response to a variation in the magnitude of said condition, a rotor pivoted on said member for rotation about an axis aligned with said predetermined direction and for bodily movement with said member, said rotor carrying said indicating element rigid therewith, a permanent magnet carried by said rotor and arranged so that a line connecting its poles is transverse of said axis, stationary means adjacent to said rotor for controlling the deflection thereof from a median normal position, said stationary means including means arranged in one plane perpendicular and adjacent to and axially on one side of said normal position of said permanent magnet for establishing a magnetic field in said plane in a predetermined direction, similar means arranged in another plane substantially parallel to the first-named plane, adjacent thereto and axially on the other side of said normal position of said permanent magnet for establishing a magnetic field in said other plane having a polarity direction opposed at a substantial angle to the predetermined direction of the first named magnetic field, so that a pole of said permanent magnet of said rotor will be acted on with equal force by the two opposing magnetic fields when said rotor is at its normal position, and a scale with which said indicating element cooperates to indicate the deviation thereof incident to axial movement of said rotor in respect to said two magnetic fields.

2. An indicating device having a motion multiplying apparatus responsive to a relatively small movement of a member which is arranged to be moved in accordance with the magnitude of a condition for imparting a relatively much larger movement to an indicating element, said device comprising said member which is arranged to be moved in a predetermined direction in response to a variation in the magnitude of said condition, a rotor pivoted on said member for rotation about an axis aligned with said predetermined direction and for bodily movement with said member, said rotor carrying said indicating element rigid therewith, a permanent magnet carried by said rotor and arranged so that a line connecting its poles is transverse of said axis, stationary means adjacent to said rotor for controlling the deflection thereof from a median normal position, said stationary means including means arranged in one plane perpendicular and adjacent to and axially on one side of said normal position of said permanent magnet for establishing a magnetic field in said plane in a predetermined direction, similar means arranged in another plane substantially parallel to the first-named plane, adjacent thereto and axially on the other side of said normal position of said permanent magnet for establishing a magnetic field in said other plane having a polarity direction opposed at a substantial angle to the predetermined direction of the first named magnetic field, so that a pole of said permanent magnet of said rotor will be acted on with equal force by the two opposing magnetic fields when said rotor is at its normal position, dial means including a scale mounted for adjustive movement substantially about said axis, spring means anchored to said dial means and biasing said member, means for adjustably moving said dial means about said axis and simultaneously for moving said member and said rotor carried thereby bodily in the direction of said axis, so as to return said rotor to its said normal position and so as to bring said permanent magnet to its median, normal position, and a stationary index cooperating with said scale on the adjustable dial means for indicating the magnitude of said condition at a time when said indicating element is adjusted to its null or normal position.

3. An indicating device in accordance with claim 1, comprising in addition, means for adjustably varying the position of said magnetic field establishing means in both said planes in a direction axial of said rotor to provide an adjustment for the normal position of said rotor.

4. An indicating device in accordance with claim 2, comprising in addition, means for adjustably varying the position of at least one of said magnetic field establishing means in a direction axial of said rotor, so as to vary the axial position at which said rotor will be substantially equally acted upon by both said magnetic fields.

5. An indicating device having a motion multiplying apparatus responsive to a relatively small movement of a member which is arranged to be moved in accordance with the magnitude of a condition for imparting a relatively much larger movement to an indicating element, said device comprising a support mounted to be moved by said member and having a threaded bushing, a rotatable shaft mounted on said support, a bar magnet and an indicating element pointer carried by said shaft, two stationary spaced horseshoe-shaped magnets arranged adjacent to each other with poles reversed for producing two opposing magnetic fields in two substantially parallel planes mounted adjacent to one end of the bar magnet, so that a pole thereof will be acted on with equal forces by the two opposing magnetic fields when said member is in a datum position, a rotatable cylindrical member fixedly mounted except for rotation, a spring spider threaded on said bushing and anchored to said cylindrical member, a dial mounted on said cylindrical member for rotation therewith and registration with said pointer, and means connected with said cylindrical member for rotating the same, whereby the cylindrical member may be rotated to cause the spider to thread on the bushing for return of said member to a datum position and the registration of the pointer and the dial is an index of the magnitude of said condition.

6. A barometer, comprising a stationary chamber having a wall movably responsive to changes in atmospheric pressure, a support having a threaded bushing carried by the movable wall, a rotatable shaft mounted in said support, a bar magnet and a pointer carried by the shaft, two stationary spaced horseshoe-shaped magnets arranged adjacent to each other with poles reversed for producing two opposing magnetic fields in two substantially parallel planes mounted adjacent to one end of the bar magnet, so that a pole thereof will be acted on with equal forces by the two opposing magnetic fields when the movable wall is in a datum position, a rotatable cylindrical member fixedly mounted except for rotation, a spring spider threaded on said bushing and anchored to said cylindrical member, a dial mounted on said cylindrical member for rotation therewith and registration with said pointer, and means connected with said cylindrical member for rotating the same, whereby the cylindrical member may be rotated to cause the spider to thread on the bushing for return of the movable wall to a datum position and the registration of the pointer and the dial is an index of the barometric pressure.

7. A barometer according to claim 6, comprising in addition, means for adjustably varying the position of said horseshoe-shaped magnets in a direction axial of said rotatable shaft, so as to afford an adjustment of the apparatus which will enable it to be used as an altimeter to determine the difference in vertical height of two points and to compensate for varying barometric pressures and so as to provide a set-up adjustment when the instrument is used as a barometer.

GUSTAF A. NELSON.

REFERENCES CITED

The following references are of record in the file of this patent:

UNITED STATES PATENTS

| Number | Name | Date |
|---|---|---|
| 1,228,325 | Joachim | May 29, 1917 |
| 1,818,170 | Stalder | Aug. 11, 1931 |
| 1,943,393 | Paulin | Jan. 16, 1934 |

FOREIGN PATENTS

| Number | Country | Date |
|---|---|---|
| 10,984 | Great Britain | 1909 |